United States Patent [19]

White

[11] 4,149,640

[45] Apr. 17, 1979

[54] MEANS FOR LAYING SOD

[76] Inventor: John M. White, 5309 NW. 26th St., Des Moines, Iowa 50313

[21] Appl. No.: 693,335

[22] Filed: Jun. 7, 1976

[51] Int. Cl.$^2$ .................. B65G 59/08; B65G 59/12
[52] U.S. Cl. ........................... 214/123; 111/2; 414/491; 414/502; 414/521; 414/537
[58] Field of Search .............. 214/8.5 A, 8.5 H, 83.22, 214/508, 518–522, 85; 47/56; 111/2, 3; 172/19, 20

[56] References Cited

U.S. PATENT DOCUMENTS

| | | | |
|---|---|---|---|
| 1,517,715 | 12/1924 | DeGeus | 111/3 X |
| 1,987,916 | 1/1935 | Thompson | 214/17 C X |
| 3,631,992 | 1/1972 | Dickinson | 214/508 X |
| 3,701,320 | 10/1972 | Fearon et al. | 214/518 X |
| 3,888,366 | 6/1975 | Prahst | 214/83.22 |
| 3,982,711 | 9/1976 | Bradley et al. | 172/19 X |

*Primary Examiner*—Robert G. Sheridan
*Attorney, Agent, or Firm*—Zarley, McKee, Thomte, Voorhees & Sease

[57] ABSTRACT

An apparatus for laying sod comprising a wheeled frame which is propelled and steered by means of an engine which drives hydraulic motors connected to the drive wheels thereof. A sod platform is pivotally mounted adjacent its forward end to the wheeled frame and may be raised from a substantially horizontal position to a substantially vertical position by means of a hydraulic cylinder connected thereto. A fork-like support is provided at the forward end of the platform and is adapted to be inserted into a sod pallet when the platform is in the vertical position. As the platform is moved to the horizontal position, the sod members are positioned on the platform at the forward end thereof. A first conveyor is movably mounted on the platform to convey the sod members towards the rearward end of the platform. An upstanding support is secured to the conveyor for movement therewith for maintaining the sod members in a substantial upstanding position on the conveyor. A guide is provided at the rearward end of the frame for guiding the sod members leaving the rearward end of the first conveyor onto the ground. A second conveyor is provided at the rearward end of the first conveyor for moving the sod members from the rearward end of the first conveyor onto the guide. The method of this invention comprises the steps of:

(1) Positioning the sod members on a substantially horizontally disposed conveyor in an upstanding and superposed relationship;
(2) Moving the device in a predetermined direction over the ground to be sodded while simultaneously operating the conveyor so that the sod members pass from the rearward end thereof; and
(3) Guiding the sod members into proper position onto the ground.

2 Claims, 7 Drawing Figures

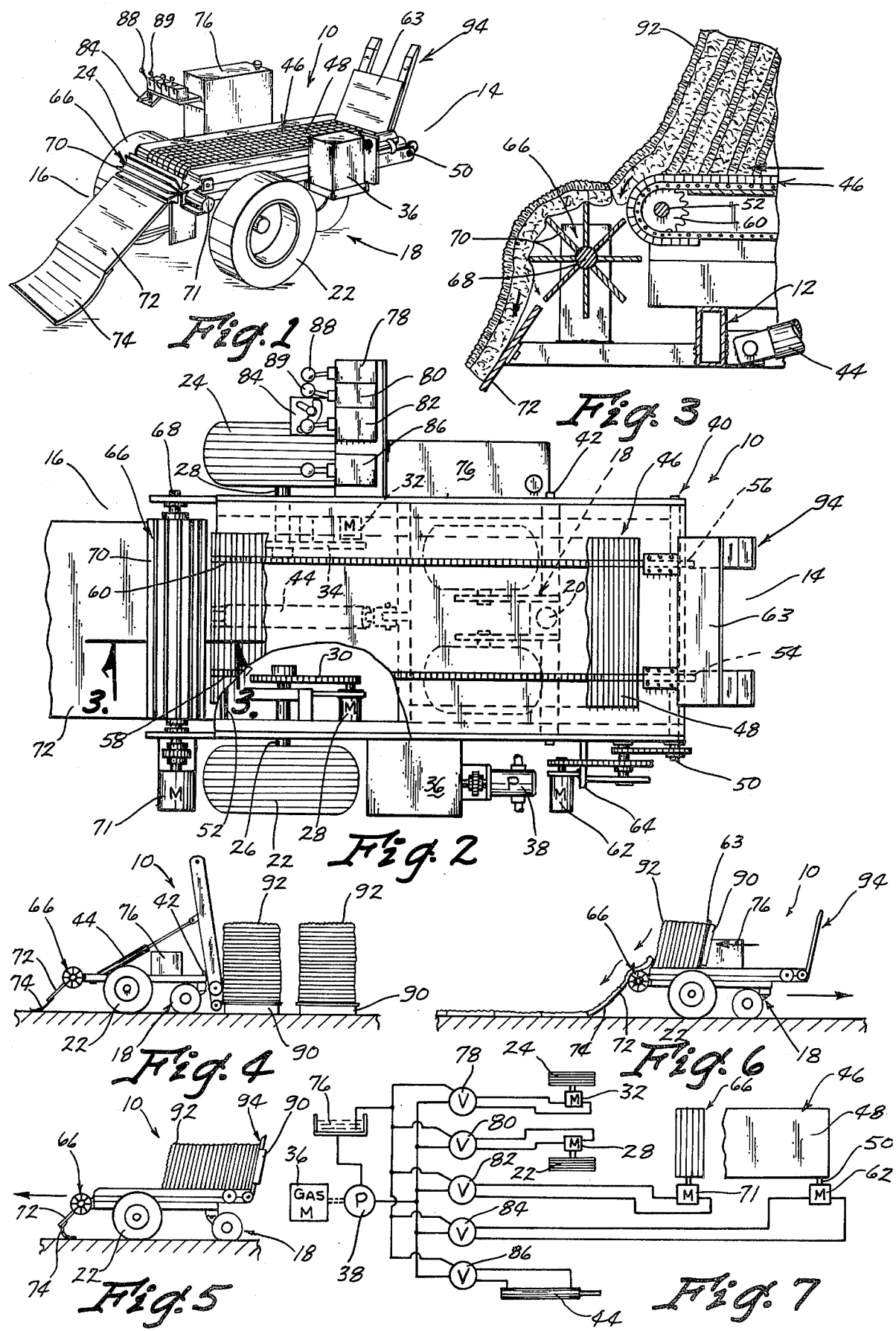

MEANS FOR LAYING SOD

BACKGROUND OF THE INVENTION

This invention relates to a method and means for laying sod.

Historically, sod has been grown in nurseries, fields or the like and has been cut in long rectangular strips, rolled and transported to the desired location. The rolls of sod are then manually carried to the bare ground and are manually unrolled into position. The task of rolling, carrying, positioning and unrolling is time consuming, burdensome and expensive.

Therefore, it is a principal object of the invention to provide a novel method and means for laying sod.

A further object of the invention is to provide an apparatus for laying sod including means for transporting the sod over the area to be sodded as well as including means for precisely positioning the sod members on the ground.

A further object of the invention is to provide an apparatus for laying sod including means for positioning the sod members thereon.

A still further object of the invention is to provide a method and means for laying sod which greatly reduces the manual labor connected therewith.

A still further object of the invention is to provide a method and means for laying sod which is economical.

DESCRIPTION OF THE DRAWINGS

FIG. 1 is a rear perspective view of the apparatus of this invention:

FIG. 2 is a top view of the apparatus with portions thereof cut away to more fully illustrate the invention:

FIG. 3 is an enlarged sectional view as seen on lines 3—3 of FIG. 2:

FIG. 4 is a side view illustrating the manner in which the conveyor may be tilted to facilitate the positioning of sod members thereon:

FIG. 5 is a view similar to FIG. 4 except that the device is illustrated as being driven to the area to be sodded;

FIG. 6 is a view similar to FIGS. 4 and 5 except that it illustrates the sod members being positioned on the ground; and FIG. 7 is a schematic of the invention.

DESCRIPTION OF THE PREFERRED EMBODIMENT

The apparatus of this invention is referred to generally by the reference numeral 10 and comprises a frame means 12 having a forward end 14 and a rearward end 16. A caster wheel assembly is pivotally secured to the frame 12 about a vertical axis referred to generally by the reference numeral 20. Drive wheels 22 and 24 are individually rotatably mounted at opposite sides of the frame by means of axles 26 and 28 respectively. Wheel 22 is propelled in either forwardly or rearwardly directions by means of the hydraulic motor 28 which is operatively connected to the inner end of the shaft 26 by means of chain 30. Likewise, wheel 24 is selectively rotated in either forwardly or rearwardly directions by means of the hydraulic motor 32 which is operatively connected to the inner end of axle 28 by means of chain 34.

The numeral 36 refers generally to a conventional gasoline engine mounted on the frame 12 for driving hydraulic pump 38 in conventional fashion. The underside of platform 40 is pivotally connected about a horizontal axis to the forward end of frame 12 at 42 so that the platform may be pivotally moved from the horizontal position illustrated in FIG. 5 to the upstanding position illustrated in FIG. 4 by means of the hydraulic cylinder 44 secured to and extending between the frame 12 and platform 40 as illustrated in the drawings. Conveyor 46 is mounted on platform 40 and generally comprises shafts 50 and 52 rotatably mounted at the forward and rearward portions of the platform 40 respectively. A pair of drive sprockets 54 and 56 are mounted on shaft 50 for rotation therewith and are adapted to engage the conveyor chain 48 in conventional fashion. A pair of sprockets 58 and 60 are mounted on shaft 52 for engagement with the conveyor chain 48. Shaft 50 is operatively driven by the hydraulic motor 62 by chains and sprockets in conventional fashion. As seen in FIG. 2, motor 62 is operatively secured to the platform 40 by means of brackets 64 so that the motor 62 will move upwardly with the platform 40 when the same is pivotally moved upwardly. Support plate 63 is secured to conveyor chain 48 at the forward end thereof for movement therewith. Plate 63 extends upwardly from chain 48 for supporting the sod members as will be described hereinafter.

Conveyor 66 is rotatably mounted at the rearward end of frame 12 and includes a shaft 68 and radially extending fins 70. Conveyor 66 is rotated by means of the hydraulic motor 71 as seen in FIG. 2. A guide plate 72 is secured to the rearward end of frame 12 and extends downwardly and rearwardly from conveyor 68 as illustrated in FIGS. 1 and 3. A flexible guide member 74 is secured to the lower end of guide 72 and is adapted to engage the ground as illustrated in FIGS. 1, 4 and 5.

Referring now to FIG. 7, pump 38 is fluidly connected to a hydraulic reservoir 76. Pump 38 is operatively connected to the valves 78, 80, 82, 84 and 86 which are operatively connected to the motors 32, 28, 70, 62 and hydraulic cylinder 44 respectively. The valves are provided with conventional operating or actuating levers with the exception of valves 78 and 80 which have the actuating levers 88 and 89 bent towards each other so that they are closely positioned each other to enable the operator to simultaneously control the valves with one hand.

The numeral 90 refers to a conventional pallet upon which the individual pieces of sod or sod members 92 are positioned as illustrated in FIG. 4. The numeral 94 refers to a fork-like support which is secured to the forward end of platform 40 and which extends upwardly and forwardly therefrom. When it is desired to lay sod, the gasoline engine 36 would be actuated with the motors 28 and 32 being operated so as to propel the wheels 22 and 24 in the desired direction. When the machine has been moved to the supply of sod, hydraulic cylinder 44 is actuated so that the platform 40 will be raised from the horizontal position to the upwardly extending position as illustrated in FIG. 4. When in the position of FIG. 4, the fork-type support 94 will be substantially horizontal so that actuation of the drive wheels 22 and 24 will cause the support 94 and the support 63 to be received within the pallet 90 as seen in FIG. 4. Hydraulic cylinder 44 is then retracted so that the platform 40 is moved from the position of FIG. 4 to the position of FIG. 5 which causes the pieces of sod to be positioned on the platform and conveyor in a superposed but slightly inclined position. The apparatus may then be driven to the area to be sodded as illustrated in FIG. 5. The flexible characteristics of the lower guide 74 prevents the same from digging into the ground as the device is being moved rearwardly to the area to be sodded.

When the area to be sodded has been reached, the apparatus is aligned with the area to be sodded. The conveyor 46 and conveyor 66 are then operated as the apparatus is moved forwardly over the area to be sodded. Actuation of the conveyor 46 causes the upstanding support plate 63 to be moved rearwardly with the conveyor chain so that the rearwardmost piece of sod 92 will be moved from the rearward end of the conveyor 46 onto the conveyor 66 which causes the member 92 to be delivered to the guide 72 and thence to the guide 74 so that the sod members are deposited or laid upon the ground as illustrated in FIG. 6.

Thus it can be seen that a novel method and means has been provided for laying sod which greatly reduces the manpower normally associated therewith. Thus it can be seen that the invention accomplishes at least all of its stated objectives.

I claim:

1. An apparatus for laying sod comprising, a wheeled frame means having rearward and forward ends, a normally horizontally disposed endless conveyor means on said frame means for conveying pieces of sod rearwardly on said frame means, support means at the forward end of said endless conveyor means, said support means including an upright support member secured to said endless conveyor means and movable therewith, said support member being inclined upwardly and forwardly with respect to said endless conveyor means for supporting said pieces of sod in an upstanding position with the normal top portion of one sod piece being positioned adjacent the normal bottom portion of the sod piece rearwardly thereof, a guide means on the rearward end of said frame means, a second sod conveyor means between said endless conveyor means and said guide means for individually and sequentially moving said pieces of sod from the rearward end of said endless conveyor means to said guide means, said second sod conveyor means comprising a rotary conveyor rotatable about a horizontal axis and having its axis disposed rearwardly and below the rearward end of said first sod conveyor means whereby the rotating second conveyor means will engage the pieces of sod moving from the rearward end of the endless conveyor means and will move said pieces of sod to said guide means, said guide means comprising a substantially flat member having upper and lower ends, said lower end of said flat member being positioned rearwardly of the upper end thereof so that said flat member guides said sod pieces downwardly and rearwardly from said second conveyor means onto the ground.

2. The apparatus of claim 1 wherein said endless sod conveyor means is pivotally mounted adjacent its forward end to said frame means to permit said endless sod conveyor means to be pivotally moved from its normal horizontally disposed position to an upright position for positioning pieces of sod on said endless sod conveyor means rearwardly of said support means.

* * * * *